United States Patent
Wakizaka et al.

(10) Patent No.: US 8,271,900 B2
(45) Date of Patent: Sep. 18, 2012

(54) INPUTTING APPARATUS

(75) Inventors: Masaaki Wakizaka, Ichinomiya (JP); Toshinari Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 213 days.

(21) Appl. No.: 12/646,633

(22) Filed: Dec. 23, 2009

(65) Prior Publication Data
US 2010/0169834 A1 Jul. 1, 2010

(30) Foreign Application Priority Data
Dec. 26, 2008 (JP) ................................. 2008-332778

(51) Int. Cl.
*G06F 3/048* (2006.01)
(52) U.S. Cl. .................... 715/821; 715/835; 345/156
(58) Field of Classification Search .................. 715/821, 715/835, 701; 345/156
See application file for complete search history.

(56) References Cited

U.S. PATENT DOCUMENTS

| | | | | |
|---|---|---|---|---|
| 5,347,295 A * | 9/1994 | Agulnick et al. | ............. | 345/156 |
| 5,736,974 A * | 4/1998 | Selker | ............. | 715/862 |
| 6,252,596 B1 * | 6/2001 | Garland | ............. | 715/810 |
| 6,844,887 B2 * | 1/2005 | Laffey et al. | ............. | 715/861 |
| 7,434,177 B1 * | 10/2008 | Ording et al. | ............. | 715/862 |
| 7,603,621 B2 * | 10/2009 | Toyama et al. | ............. | 715/707 |
| 7,610,274 B2 * | 10/2009 | Gotoh | ............. | 1/1 |
| 7,818,672 B2 * | 10/2010 | McCormack et al. | ............. | 715/715 |
| 7,966,573 B2 * | 6/2011 | Dodge et al. | ............. | 715/815 |
| 2003/0092400 A1 | 5/2003 | Shimabukuro | | |
| 2003/0222923 A1 * | 12/2003 | Li | ............. | 345/815 |
| 2004/0160419 A1 * | 8/2004 | Padgitt | ............. | 345/173 |
| 2005/0024341 A1 * | 2/2005 | Gillespie et al. | ............. | 345/173 |
| 2005/0193351 A1 * | 9/2005 | Huoviala | ............. | 715/815 |
| 2006/0161871 A1 * | 7/2006 | Hotelling et al. | ............. | 715/863 |
| 2006/0209016 A1 * | 9/2006 | Fox et al. | ............. | 345/156 |
| 2008/0098331 A1 * | 4/2008 | Novick et al. | ............. | 715/835 |
| 2008/0303799 A1 | 12/2008 | Schwesig et al. | | |
| 2010/0162171 A1 * | 6/2010 | Felt et al. | ............. | 715/835 |

FOREIGN PATENT DOCUMENTS

CN 1416254 A 5/2003
(Continued)

OTHER PUBLICATIONS

Japan Patent Office; Notice of Reasons for Rejection in Japanese Patent Application No. 2008-332778 mailed on Aug. 31, 2010.

(Continued)

*Primary Examiner* — Phenuel Salomon
(74) *Attorney, Agent, or Firm* — Baker Botts L.L.P.

(57) ABSTRACT

An inputting apparatus including: a display unit on which an image is displayed; a detecting portion configured to detect an approach value which represents an approaching or a touching degree of an input object with respect to each position in the display unit and which becomes larger where the approaching or touching degree is a certain degree than where the approaching or touching degree is a degree smaller than the certain degree; a button-display portion which displays at least one button; a receiving portion which receives an input of a predetermined command assigned to one of the at least one button where an approach value detected in the one button exceeds a first threshold value; and an enlarging and displaying portion which enlarges and displays only the one button on the display unit where the approach value exceeds a second threshold value smaller than the first threshold value.

16 Claims, 6 Drawing Sheets

FOREIGN PATENT DOCUMENTS

| | | | |
|---|---|---|---|
| CN | 101320303 | A | 12/2008 |
| DE | 10310794 | A1 | 9/2004 |
| DE | 102007039669 | A1 | 2/2009 |
| EP | 1942401 | A1 | 7/2008 |
| EP | 2105826 | A2 | 9/2009 |
| EP | 2105827 | A2 | 9/2009 |
| JP | H10-269022 | A | 10/1998 |
| JP | 2005-352924 | A | 12/2005 |
| JP | 2006-236143 | A | 9/2006 |
| JP | 4479962 | B2 | 6/2010 |
| WO | 2008-153600 | A1 | 12/2008 |

OTHER PUBLICATIONS

European Patent Office; Extended European Search Report for Application No. EP09252856, dated Dec. 8, 2010.

The State Intellectual Property Office of the People's Republic of China, Notification of the First Office Action for Chinese Patent Application No. 200910262669.7, issued Nov. 24, 2011.

\* cited by examiner

INPUTTING APPARATUS

CROSS REFERENCE TO RELATED APPLICATION

The present application claims priority from Japanese Patent Application No. 2008-332778, which was filed on Dec. 26, 2008, the disclosure of which is herein incorporated by reference in its entirety.

BACKGROUND OF THE INVENTION

1. Field of the Invention

The present invention relates to an inputting apparatus.

2. Description of the Related Art

There is known a technique in which, when a finger or the like of a user has approached input buttons displayed on a display device, an approach sensing device senses this approach, so that images of the input buttons located on the periphery of coordinates the finger has approached are enlarged and displayed.

SUMMARY OF THE INVENTION

However, in the above-described technique, since the images of the input buttons located on the periphery of the coordinates the finger or the like has approached are enlarged and displayed, button images the user does not want to (intend to) select are also enlarged. This may cause risks of causing an operational error, overloading the device owing to the operational error, and, in the case of a device using limited resources, consuming the resources too much.

In order to solve the above-described problems, a first aspect in accordance with the present invention provides an inputting apparatus, comprising: a display unit on which an image is displayed; a detecting portion configured to detect an approach value which represents an approaching degree or a touching degree of an input object with respect to each of positions in the display unit and which becomes larger where the approaching degree or the touching degree is a certain degree than where the approaching degree or the touching degree is a degree smaller than the certain degree; a button-display portion configured to display at least one button on the display unit; a receiving portion configured to receive an input of a predetermined command assigned to one of the at least one button where an approach value detected in the one button displayed by the button-display portion exceeds a first threshold value; and an enlarging and displaying portion configured to enlarge and display only the one button on the display unit where the approach value detected in the one button exceeds a second threshold value which is smaller than the first threshold value.

According to the construction as described above, the button to be selected can be easily checked.

A second aspect in accordance with the present invention provides an inputting apparatus comprising: a display unit on which an image is displayed; a detecting portion configured to detect an approach value which represents an approaching degree or a touching degree of an input object with respect to each of positions in the display unit and which becomes larger where the approaching degree or the touching degree is a certain degree than where the approaching degree or the touching degree is a degree smaller than the certain degree; a button-display portion configured to display at least one button on the display unit; a receiving portion configured to receive an input of a predetermined command assigned to one of the at least one button where an approach value detected in the one button displayed by the button-display portion exceeds a first threshold value; and a button-name display portion configured to display a button name representing a name of the one button on the display unit at a position not overlapping with the one button, where the approach value detected in the one button exceeds a second threshold value which is smaller than the first threshold value.

According to the construction as described above, since the button name is displayed at the position not overlapping the button, thereby restraining that the problem occurs in which the button name cannot be checked because the button name is covered with or hidden by the input object.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which.

DETAILED DESCRIPTION OF THE EMBODIMENT

Hereinafter, there will be described an embodiment of the present invention by reference to the drawings. There will be explained, respectively referring to FIGS. 1, 2, 3A-3D, and 4, an external structure of a multi-function peripheral (MFP) 1 as an example of an inputting apparatus of the present invention, a hardware configuration of the inputting apparatus, an example of an operation of the inputting apparatus, and a display updating processing of the inputting apparatus.

Figure 1:
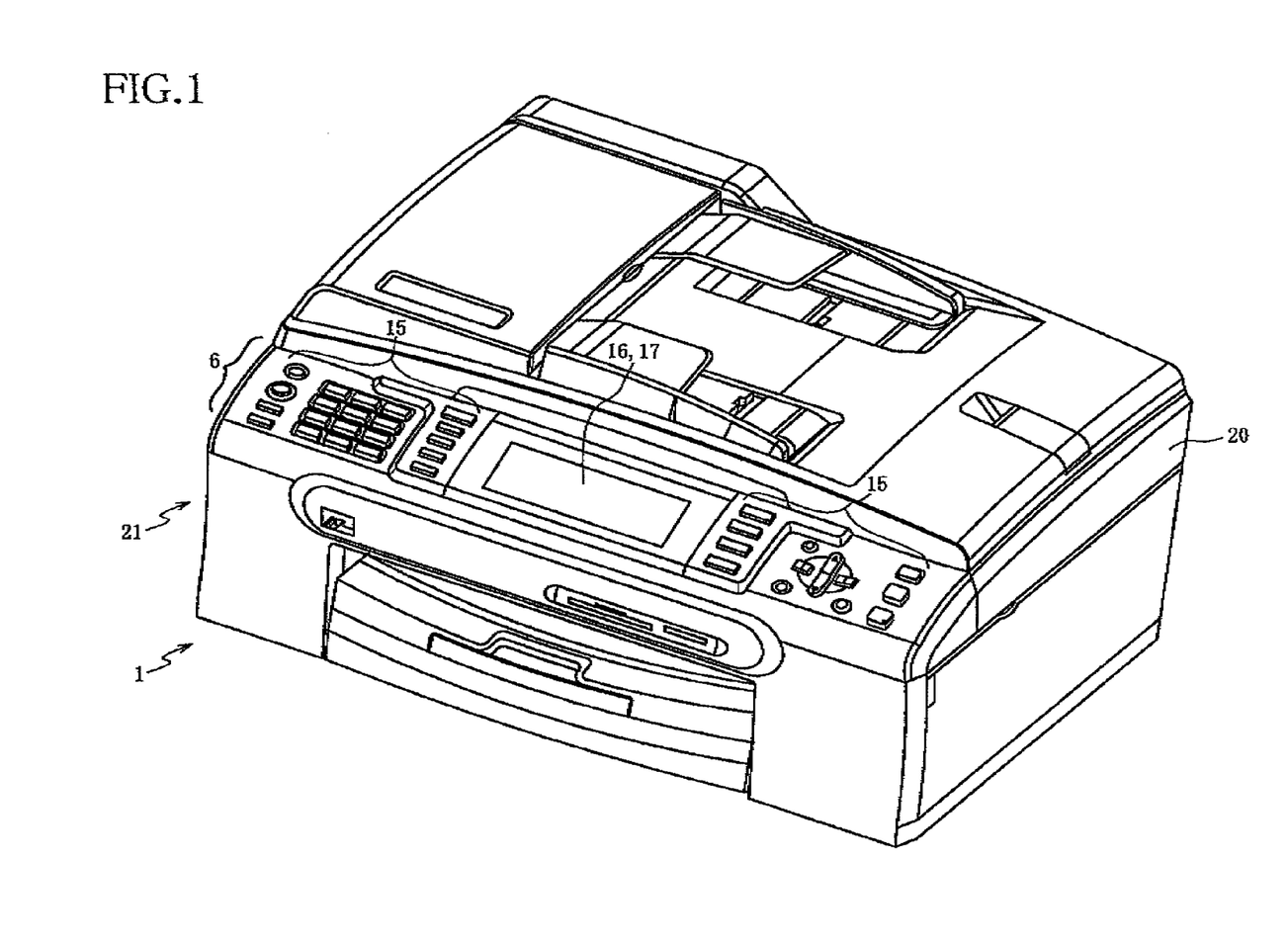
FIG. 1 is a perspective view showing an external structure of an MFP as an example of an inputting apparatus of the present invention.

On an upper front portion of the MFP 1 as the present embodiment, there are provided an LCD (a part of a display unit) 16 and a touch panel (a part of a detecting portion) 17 in addition to operational keys 15. A user can perform various settings and various controls of the MFP 1 by performing an inputting operation with the operational keys 15 or the touch panel 17.

Where the user performs the various settings and the various controls with the touch panel 17, when an input object (e.g., a user's finger and a stylus) has approached a predetermined distance to a setting item displayed on the LCD 16, the MFP 1 displays the setting item in a state in which the setting item is enlarged. As a result, it is possible to prevent an operational error that the user touches an unintended area with his or her finger because the setting item is hidden by the finger, for example.

Figure 2:
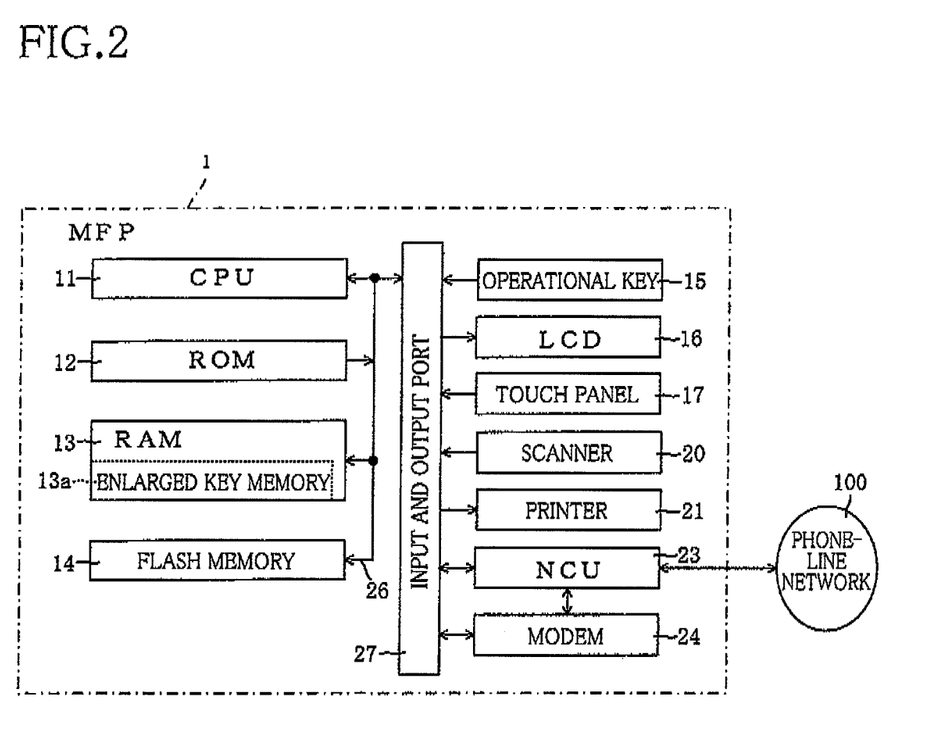
FIG. 2 is a block diagram showing an electric construction of the MFP.

The MFP 1 is configured to perform facsimile communication with an external device, not shown, connected via a phone-line network 100 (with reference to FIG. 2). Further, this MFP 1 has various functions such as a printer function, a scanner function, and a copying function.

On an upper front portion of the MFP 1, there is provided an operational panel 6 having an elongated shape. This operational panel 6 is for operating the MFP 1 and is mainly provided with the operational keys 15, the LCD 16, and the touch panel 17. The user can set and control the various functions by operating various buttons of the operational keys 15 or by operating the touch panel 17.

On the LCD 16, there are displayed, e.g., a menu, an operational procedure, and a state of a processing currently being performed. The touch panel 17 as one type of the inputting apparatus is provided on a display screen of the LCD 16. Thus, touching of the user's finger on an image displayed on the LCD 16, e.g., an image of a key or a button (hereinafter may be referred to as "key image") means touching of the finger on the touch panel 17 provided on the display screen of the LCD 16.

Where an approach value representing a touch (a contact) or an approach of a finger on the touch panel 17 has been detected, a position at which the user has touched or approached the touch panel 17 is specified. In other words, a positional-information detecting portion of a CPU 11 (with reference to FIG. 2) which will be described below detects positional information indicating a position of the finger. In accordance with a position of the finger detected by the touch panel 17, the CPU 11 performs a processing corresponding to an image displayed at a position of the finger (for example, the key image). It is noted that the approach value representing the touch (or the approach) of the finger is a value representing a touching degree as a degree of the touch (or an approaching degree as a degree of the approach) of the input object or means with respect to the touch panel 17 (the LCD 16), and where the touching degree (or the approaching degree) of, e.g., the finger with respect to the touch panel 17 is a certain degree, the approach value takes a value larger than the approach value in the case where the touching degree (or the approaching degree) is a degree smaller than the certain degree.

In general, there are touch panels of various types such as resistance membrane type and infrared type. In the present embodiment, a touch panel of projected electrostatic capacitance type is employed as the touch panel 17. The touch panel of the electrostatic capacitance type is configured to use a change of an electrostatic capacitance between the finger and the touch panel by an electrostatic bond between the finger and the touch panel which is caused when a tip of the finger has approached or touched the touch panel. The MFP 1 including the touch panel of the electrostatic capacitance type is configured to detect the change of the electrostatic capacitance, thereby also detecting that the finger is approaching the touch panel in addition to whether the finger is touching the touch panel or not.

Further, the touch panel of the projected type is a touch panel in which an area for detecting the touch or approach of the finger or the like is minutely separated into a plurality of areas like a grid, for example, in order to simultaneously detect changes of respective electrostatic capacitances at a plurality of positions in the touch panel 17, and which is provided with a sensor (specifically, an electrode pattern) at each of the areas. It is noted that each of the areas will be referred to as a detecting area.

It is noted that a voltage value (corresponding to the approach value) according to an approach distance of the user's finger (i.e., a detected electrostatic capacitance) is outputted from the sensor in each detecting area. Specifically, in accordance with the approach of the user's finger, an outputted voltage value is increased, and a voltage value equal to or greater than a threshold value A (a second threshold value) is outputted at a time immediately before the finger has touched one of the detecting areas (e.g., a distance between the finger and the detecting area becomes about 2-3 mm), for example, while a voltage value equal to or greater than a threshold value B (a first threshold value) is outputted when the finger has touched one of the detecting areas. That is, in accordance with the approach of the user's finger to the touch panel 17, the approach value corresponding to the voltage value is increased, and an approach value equal to or greater than the second threshold value (the threshold value A with respect to the voltage value) is detected at the time immediately before the finger has touched one of the touch panel 17 (e.g., the distance between the finger and the detecting area of the touch panel 17 becomes about 2-3 mm), while an approach value equal to or greater than the first threshold value (the threshold value B) is detected when the finger has touched one of the detecting areas. It is noted that, the first threshold value as the threshold value with respect to the approach value is greater than the second threshold value (in other words, the second threshold value is a value which is smaller than the approach value at a time when the user's finger touches the LCD 16 or the touch panel 17) while the threshold value B as the threshold value with respect to the voltage value is greater than the threshold value A.

On the other hand, in accordance that the user's finger is distant from the touch panel 17, the outputted voltage value is decreased. When the distance between the finger and the detecting area becomes equal to or greater than 20 mm, for example, the change of the electrostatic capacitance is not detected, so that a, voltage value "0" is outputted. That is, in accordance that the user's finger is distant from the touch panel 17, the approach value is decreased. When the distance between the finger and the detecting area of the touch panel 17 becomes equal to or greater than 20 mm, the approach value becomes "0".

There will be next explained an electric construction of the MFP 1 with reference to FIG. 2. The MFP 1 mainly includes the CPU 11, a ROM 12, a RAM 13, a flash memory 14, the operational keys 15, the LCD 16, the touch panel 17, a scanner 20, a printer 21, an NCU 23, and a modem 24.

The CPU 11, the ROM 12, the RAM 13, and the flash memory 14 are connected to each other via a bus line 26. Further, the operational keys 15, the LCD 16, the touch panel 17, the scanner 20, the printer 21, the NCU 23, the modem 24, the bus line 26 are connected to each other via an input and output port 27.

The CPU 11 is configured to control the various functions of the MFP 1 and to control various portions of the MFP 1 which are connected to the input and output port 27, in accordance with fixed values and programs stored in the ROM 12, the RAM 13, and the flash memory 14, or in accordance with various signals transmitted and received via the NCU 23. Further, the CPU 11 is configured to simultaneously display, as a button-display portion, the key (button) images.

The ROM 12 is an unrewritable memory which stores, e.g., control programs performed in the MFP 1. The ROM 12 stores a program for performing a display updating processing indicated by a flow-chart in FIG. 4 which will be described below.

The RAM 13 is a rewritable volatile memory for temporarily storing various data when various operations of the MFP 1 are performed. The RAM 13 includes an enlarged key memory 13*a*.

The flash memory 14 is a rewritable nonvolatile memory. Data stored in this flash memory 14 is kept also after the MFP 1 is turned off.

Figure 3A:
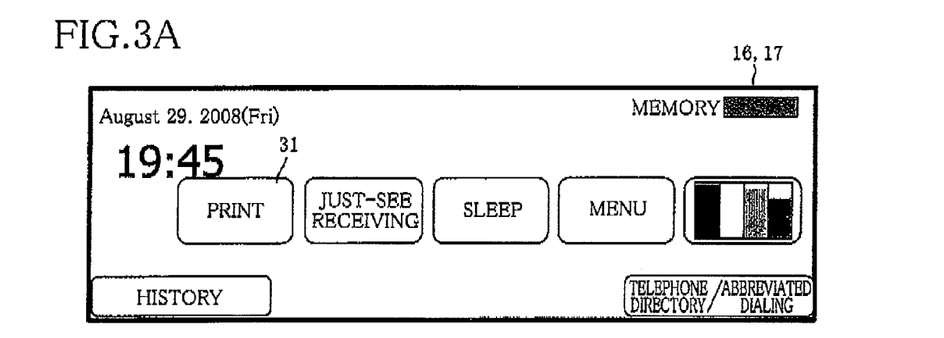
FIG. 3A is a conceptual view showing an example of display of key images in the case where an inputting operation is not performed through a touch panel.
Figure 3B:
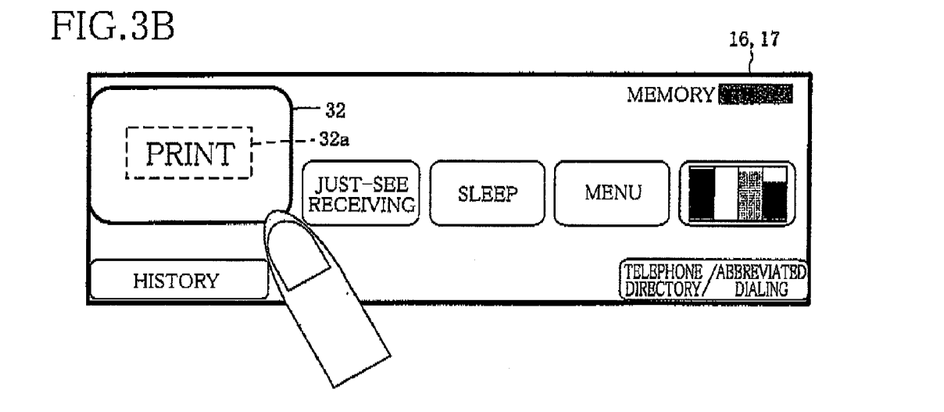
FIGS. 3B and 3C are conceptual views each showing an example of display of the key images in the case where one of the key images is enlarged as a result of approach of a user's finger.
Figure 3C:
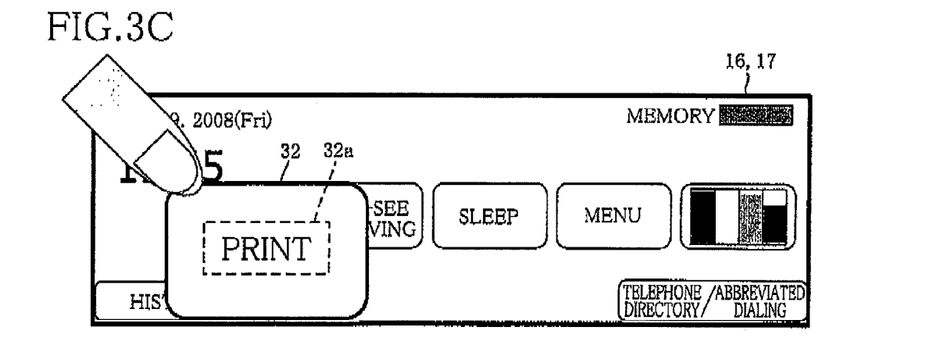

There will be next explained an example of display of the key images displayed on the LCD 16 with reference to FIGS. 3A-3C. As shown in FIG. 3A, where the user is not performing the inputting operation with the touch panel 17, various key images for performing the various settings of the MFP 1 and the various functions of the MFP 1 are displayed on the LCD 16 in a normal size.

It is noted that a size of each of the key images shown in FIG. 3A is referred to as "the normal size of the key image". Further, an entire area in which one key image is displayed will be referred to as a display area of the key image. The user can perform, by touching a part of the display area of each key image displayed on the LCD 16, a processing corresponding to the touched key image.

In FIG. 3B, the user's finger has approached the vicinity of key images respectively representing "PRINT", "JUST-SEE RECEIVING", "SLEEP", and only a print key which is the key image representing the "PRINT" and includes a detecting area having the largest output voltage is enlarged and displayed. Further, a print key 32 shown in FIG. 3B is a key image displayed such that a print key 31 is enlarged at a predetermined ratio.

That is, as shown in FIG. 3B, the print key 31 shown in FIG. 3A is enlarged and displayed so as to overlap with display of a current time, with a right and lower corner of the display area of the key image being as a reference point (an origin point). When the print key 32 is displayed so as to be enlarged, an item name 32a ("PRINT" in FIG. 3B) displayed in the display area is also displayed so as to be enlarged. Thus, it is possible to restrain that where the user's finger has approached the key image, the key image and/or the item name of the key image is or are hidden by the finger. Consequently, it is possible to prevent the operational error that the user touches an unintended area with his or her finger, for example. It is noted that the reference point (the origin point) for displaying the print key 32 can be determined on the basis of a position at which the user's finger has entered the print key 31 for the first time. Where the position at which the user's finger has entered the print key 31 for the first time is the vicinity of a right and lower corner of the display area of the print key 31, the print key 32 can be displayed so as to be enlarged, with the reference point being as the right and lower corner of the display area of the print key 31. It is noted that an output voltage of each of detecting areas of the display area of the print key 31 may be stored in advance, thereby allowing that the position at which the user's finger has entered the print key 31 for the first time is specified by referring a history of the output voltage of the detecting area, when the output voltage value exceeds the threshold value A in the display area of the print key 31. Further, the reference point may be determined on the basis of a position on the print key 31 which the user's finger has approached for the first time (i.e., the position at which the output voltage exceeds the threshold value A for the first time). Further, the MFP 1 may be configured such that the display area of the print key 31 is separated into, e.g., nine areas arranged three by three in lengthwise and widthwise directions of the display area. Where the MFP 1 is thus configured, it is possible that the area the user's finger has approached for the first time is determined from the nine areas, and the print key 32 is enlarged and displayed, with a predetermined position of the area (the right and lower corner or a left and lower corner of the display area of the print key 31, for example) being as the reference point.

On the other hand, where the user's finger has approached (but has not touched) a left and upper portion of the print key 31 displayed on the LCD 16, for example, in a state shown in FIG. 3A, the print key 32 is enlarged and displayed as shown in FIG. 3C, In FIG. 3C, the print key 32 is a key image displayed such that the print key 31 is enlarged at a predetermined ratio.

That is, as shown in FIG. 3C, the print key 31 shown in FIG. 3A is displayed so as to overlap with a right half of a history key image, with a left and upper corner of the display area of the key image being as the reference point (the origin point). When the print key 32 is enlarged and displayed, the item name 32a ("PRINT" in FIG. 3C) displayed in the display area is also enlarged and displayed. Thus, as described above, it is possible to restrain that the key image and/or the item name of the key image is or are hidden by the finger, thereby preventing the operational error that the user touches an unintended area with his or her finger, for example. It is noted that, in an example shown in FIG. 3, the position at which the user's finger has entered the print key 31 for the first time is the vicinity of the left and upper corner of the print key 31, and thus the reference point is located at a left and upper corner of the display area of the print key 31.

Figure 4:
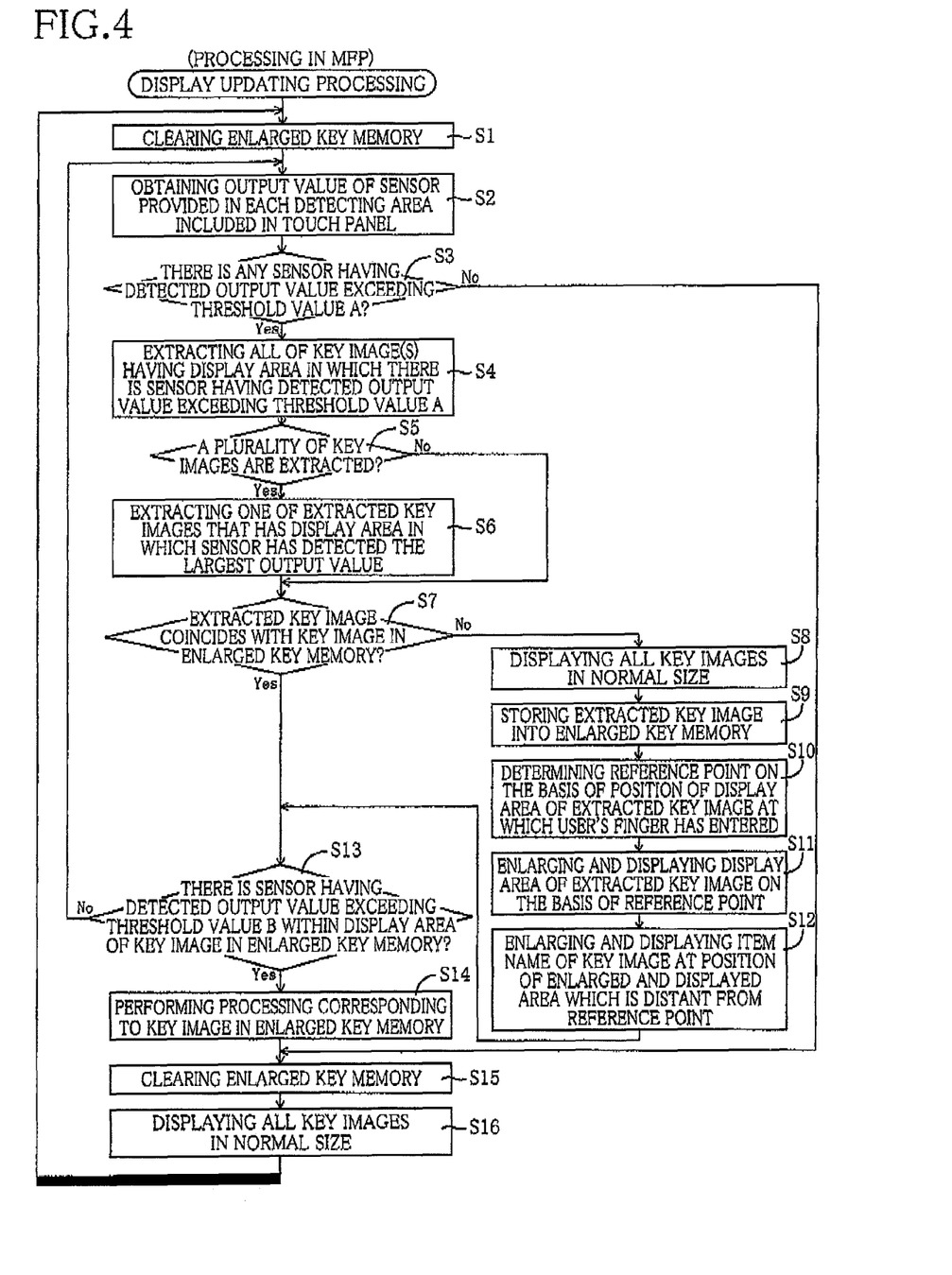
FIG. 4 is a flow-chart showing a display updating processing of the MFP.

There will be next explained the display updating processing performed by the CPU 11 of the MFP 1, with reference to FIG. 4. The display updating processing is a processing for enlarging and displaying the display area of the key image when the user's finger has approached (but has not touched) the key image where the inputting operation is performed by the touch panel 17. The display updating processing is repeatedly performed from turning on a main power of the MFP 1 until the main power is turned off.

In this display updating processing, initially in S1, the enlarged key memory 13a of the RAM 13 is cleared. Next, in S2, the CPU 11 obtains the output value of the sensor provided in each of all the detecting areas included in the touch panel 17.

Then, the CPU 11 judges in S3 whether there is any sensor having detected the output value exceeding the threshold value A or not. Where the CPU 11 has judged that there is any sensor in which the output value exceeds the threshold value A (S3: Yes), the CPU 11 extracts in S4 all of the key image(s) having the display area in which there is the sensor having detected the output value exceeding the threshold value A. As a result, the CPU 11 extracts all the key images the user's finger is approaching.

On the other hand, where there is no sensor having detected the output value exceeding the threshold value A (S3: No), the CPU 11 skips S4-S14 and goes to S15 because there is a possibility that the user's finger does not approach the touch panel 17.

Next, the CPU 11 judges in S5 whether a plurality of the key images are extracted in S4 or not. Where the CPU 11 has judged that the plurality of the key images are extracted (S5: Yes), the CPU 11 extracts in S6 one of the extracted the key images that has the display area in which the sensor has detected the largest output value. That is, the CPU 11 extracts only one key image of the extracted key images which the user's finger has approached the most or to the nearest position.

In general, the user moves his or her forger toward the key image to be selected. Thus, even if a plurality of the key images have been extracted, the CPU 11 can pick up only the key image the user intends to select, by extracting one key image having the largest output value detected by the sensor.

On the other hand, where the CPU 11 has judged that only one key image has been extracted in S4 (S5: Yes), the CPU 11 skips S6 and goes to S7. Then, in S7, the CPU 11 judges whether the extracted key image coincides with a key image indicated by key information stored in the enlarged key memory 13a of the RAM 13. Where the CPU 11 has judged that the extracted key image coincides with the key image indicated by the key information stored in the enlarged key memory 13a (S7: Yes), the key image the user's finger has approached the most has already been enlarged. Thus, the CPU 11 skips S8-S12 and goes to S13.

On the other hand, where the CPU 11 has judged that the extracted key image does not coincide with the key image indicated by the key information stored in the enlarged key memory 13a (S7: No), the key image the user's finger is approaching changes from the enlarged and displayed key image to another key image, or the user's finger has approached the key image in a state in which the key image is not enlarged and displayed.

In this case, since the enlarged and displayed key image may already exist, the CPU 11 temporarily displays in S8 all the key images in the normal size (with reference to FIG. 3A) in order to return the size of the key image to the normal size. Then, in S9, the CPU 11 stores, into the enlarged key memory 13a, the key information (e.g., a name or a number of the key) of the key image extracted in S6.

Then, in S10, the CPU 11 determines the reference point for enlarging and displaying the key image on the basis of a position of the display area of the extracted key image at which the user's finger has entered the display area for the first time. For example, where the user's finger approaches from the right and lower corner of the key image and moves toward a central portion thereof, the user's finger initially approaches the most to a right and lower portion of the display area in the display area of the key image. Thus, where the user's finger exists at the right and lower portion of the display area, the CPU 11 can display the item name of the key image (i.e., the name of the key image or a button name) at a position distant from the user's finger by enlarging and displaying the key image with the right and lower corner of the display area being as a reference. It is noted that, in S10, the reference point for enlarging and displaying the key image is determined on the basis of the position at which the user's finger has entered the display area for the first time, but it is also possible that a position of the display area of the key image at which the sensor having detected the largest output value is located is determined as the reference point. There is a relatively high possibility that the output value of the sensor located at the right and lower portion of the display area of the key image becomes the largest at a time immediately before the key image is enlarged and displayed. Thus, the CPU 11 can display the item name of the key image at a position distant from the user's finger by setting the position of the sensor at the reference point.

Next, in S11, the display area of the extracted key image is enlarged and displayed, with the reference point being as the origin point. Then, in S12, the CPU 11 enlarges and displays the item name of the key image (i.e., the name of the key image) at a position of the enlarged display area which position is distant from the reference point by equal to or more than a predetermined distance (for example, a width of a finger), and goes to S13. It is noted that, when the item name of the key image is to be enlarged and displayed where the display area of the key image is being enlarged and displayed, the item name of the key image is displayed within a frame of the key image. As a result, the item name of the enlarged and displayed key image can be clearly displayed.

Since the item name of the key image is displayed at the position distant from the reference point by, e.g., equal to or more than the width of the finger by the processing of S12, it is possible to restrain that the item name of the key image is hidden by the user's finger at a time when the key image is enlarged and displayed. Thus, it is possible to restrain that the user touches an unintended area with his or her finger, thereby preventing the operational error.

In S13, the CPU 11 judges whether there is a sensor having detected an output value exceeding the threshold value B within the key image indicated by the key information stored in the enlarged key memory 13a, i.e., the display area of the enlarged and displayed key image.

Where the CPU 11 has judged that there is no sensor having detected the output value exceeding the threshold value B within the display area of the enlarged and displayed key image (S13: No), the key image has already been enlarged and displayed, but there may be a case in which the user's finger has not touched the key image yet. Thus, the CPU 11 repeatedly performs the processings of the above-described S2-S13.

On the other hand, where the CPU 11 has judged in S13 that there is any sensor having detected the output value exceeding the threshold value B within the display area of the enlarged and displayed key image (S13: Yes), the user's finger has touched the enlarged and displayed key image. Thus, the CPU 11 performs in S14 a processing corresponding to the key image indicated by the key information stored in the enlarged key memory 13a. For example, where the key information stored in the enlarged key memory 13a indicates the print key 32, image recording is performed by the printer 21 on the basis of image data to be designated by the user.

Then, the CPU 11 clears in S15 the enlarged key memory 13a and displays in S16 all the key images in the normal size (with reference to FIG. 3A). It is noted that the processings of S15 and S16 are performed where the user's finger has touched the key image, and a processing corresponding to the key image has been performed and where the user's finger has moved away from the touch panel 17 (or does not approach the touch panel). As a result, all the key images are displayed in the normal size.

By the above-described display updating processing indicated by the flow-chart in FIG. 4, when the user's finger has approached (but has not touched) the key image in the inputting operation through the touch panel 17, the display area of the key image can be enlarged and displayed. Further, in the display area of the enlarged and displayed key image, the item name can be enlarged and displayed at a position at which the finger is moved away (i.e., the position distant from the reference point by e.g., equal to or more than the width of the finger).

As a result, where the user operates the touch panel 17, it is possible to restrain that the item name of the key image is hidden by the user's finger. Thus, it is possible to prevent the operational error that the user touches an unintended area with his or her finger, for example. Further, where a plurality of the key images each having the display area in which there is the sensor having detected the output value exceeding the threshold value A, only the key image having the display area in which there is the sensor having detected the largest output value can be enlarged and displayed. Thus, the operational error can be prevented by enlarging and displaying only the key image the user is expected to select. Further, where the output value detected by the sensor in the display area of the key image different from the enlarged and displayed key image becomes a value larger than the output value detected by the sensor in the enlarged and displayed key image, the different key image is enlarged and displayed instead of the enlarged and displayed key image. Thus, it becomes possible to enlarge and display the key image the user is expected to select, thereby preventing the operational error.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, in the present embodiment, the touch panel 17 of the projected electrostatic capacitance type is used, but the type of the touch panel 17 is not limited. For example, any type may be employed as long as a touch panel which can detect the approach of the finger is used. For example, there can be used a touch panel of a type in which the approach or the touch of the finger is detected by infrared rays or an electric field.

Here, there will be explained a modification of the enlarged display of the key image displayed on the LCD 16 with reference to FIGS. 5A-5D.

As described above, in the present embodiment, the display area of the key image the user's finger has approached the most is enlarged and displayed, and the item name of the key image (i.e., the name of the key image) is enlarged and displayed in the display area at the position distant from the reference point by, e.g., equal to or more than the width of the finger.

Figure 5A:
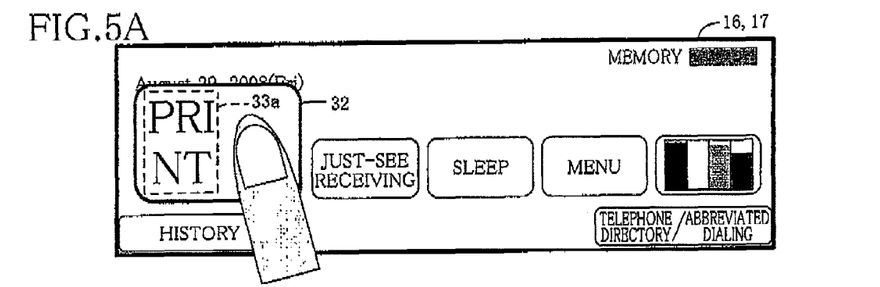
FIGS. 5A-5D are conceptual views each showing a modification of an enlarged display of the key image.

In addition to this configuration, the MFP 1 may be configured in the following manner. That is, in a state in which the user's finger has approached the enlarged and displayed print key 32, as shown in FIG. 5A, a position at which an item name 33a of the print key 32 is displayed continues to be changed to a position distant from the user's finger such that the item name 33a is not hidden by the user's finger, during movement of the user's finger in the display area of the print key 32.

It is noted that, where the item name 33a cannot be displayed in the display area because the position distant from the user's finger is located on an outside of the display area of the print key 32, for example, the item name 33a may be displayed in a relatively small size, and may be displayed so as to be separated into a plurality of parts (e.g., the item name "PRINT" is separated into "PRI" and "NT"), for example. Where the MFP 1 is thus configured, the item name can be displayed in a frame of the enlarged and displayed key image, permitting the item name of the key image to be clearly displayed. It is noted that, as long as the item name is displayed in the frame of the enlarged and displayed key image, a manner of the display can be changed. For example, display of horizontal writing can be changed to display of vertical writing.

Further, for example, the MFP 1 may be configured such that an output value of each of the respective sensors of all the detecting areas of the touch panel 17 are stored into the RAM 13 periodically (e.g., once in 100 ms), and the item name is displayed at a position avoiding a position of the finger at a time immediately before the key image is enlarged and displayed. Further, the MFP 1 may be configured such that a direction in which the user's finger is to be moved is calculated and estimated on the basis of a change of the position of the user's finger, and the item name 33a is displayed at a tip of the user's finger. Where the MFP 1 is thus configured, the item name 33a is not hidden by the user's finger, and the operational error can be prevented because it becomes easy for the user to visually recognize the item name 33a.

Figure 5B:
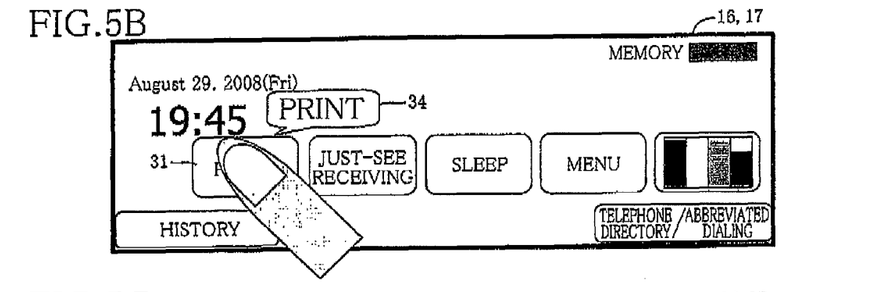
Figure 6:
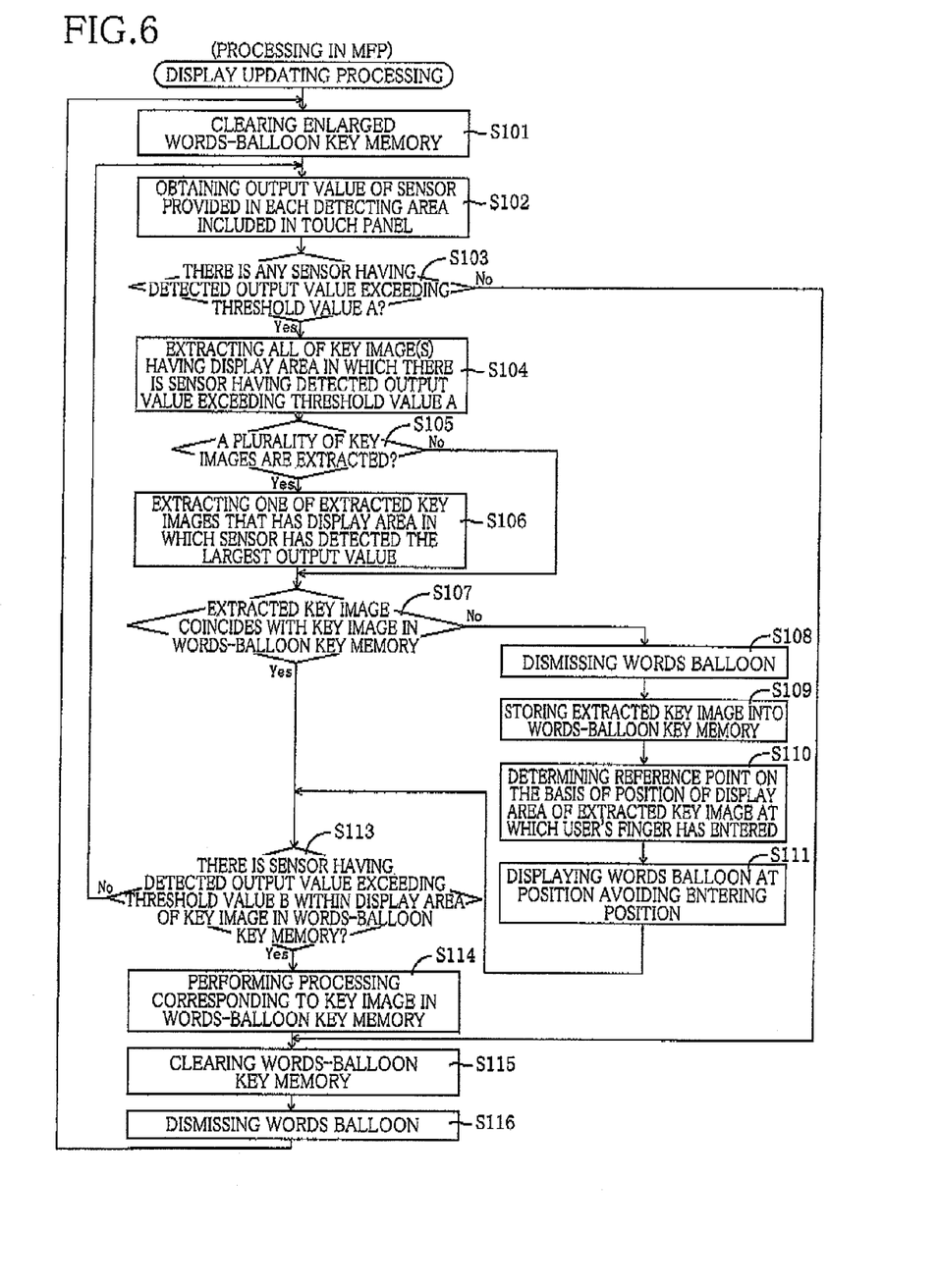
FIG. 6 is a flow-chart showing another display updating processing of the MFP.

Further, the MFP 1 may be configured in the following manner. That is, the display area and the item name of the key image 31 the user's finger has approached the most are not enlarged and displayed, and a words balloon 34 is displayed on a periphery of the key image 31 or on an outside of the key image 31 such that, as shown in FIG. 5B, a position (a reference point) at which the finger has entered the display area of the key image 31 is avoided, for example, and the item name of the key image 31 the user's finger has approached the most is displayed within the words balloon 34 (i.e., within a words-balloon frame), Where the MFP 1 is thus configured, even where the key image 31 and/or the item name in the display area of the key image 31 is or are hidden by the user's finger, the user can recognize which key image his or her finger has approached the most. Thus, it is possible to prevent the operational error that the user touches an unintended area with his or her finger. It is noted that a flow-chart for realizing the present modification is shown in FIG. 6. It is noted that explanations of processings similar to those in the above-described embodiment will be dispensed with. In FIG. 6, where the CPU 11 has judged that the extracted key image does not coincide with the key image indicated by key information stored in a words-balloon key memory of the RAM 13 (S107: No), the CPU 11 does not display or dismisses the words balloon in S108, and stores in S109 the extracted key image into the words-balloon key memory. Then, in S110, an entering position at which the user's finger has entered is specified in the display area of the extracted key image, and the words balloon of the extracted key image is displayed in S111 at the position avoiding the entering position. As a result, the words balloon is displayed at the position distant or different from the entering position of the finger, whereby the user can recognize which key image his or her finger has approached the most.

In view of the above, the CPU 11 can be considered to include a receiving portion which is configured to receive the input of a predetermined command assigned to the key (button) where the approach value of the key image (the button image) displayed by the button-display portion exceeds the first threshold value, and which performs the processings of S14 and S114. Further, the CPU 11 can also be considered to include an enlarging and displaying portion configured to enlarge and display the key image where the approach value of the key image exceeds the second threshold value which is smaller than the first threshold value, and which performs the processing of S11. Further, the CPU 11 can also be considered to include an extracting portion configured to extract all ones of the key images displayed on the LCD 16, the ones having respective approach values having detected by the touch panel 17, each of which exceeds the second threshold value, and which performs the processings of S4 and S104. Further, the CPU 11 can also be considered to include an entering-position specifying portion configured to specify the entering position on the basis of the positional information detected by the positional-information detecting portion, and which performs the processings of S10 and S110. Further, the CPU 11 can also be considered to include a button-name display portion configured to display the name of the key image at a position not overlapping with the key image, where the approach value of the key image exceeds the second threshold value, and which performs the processing of S111.

Figure 5C:
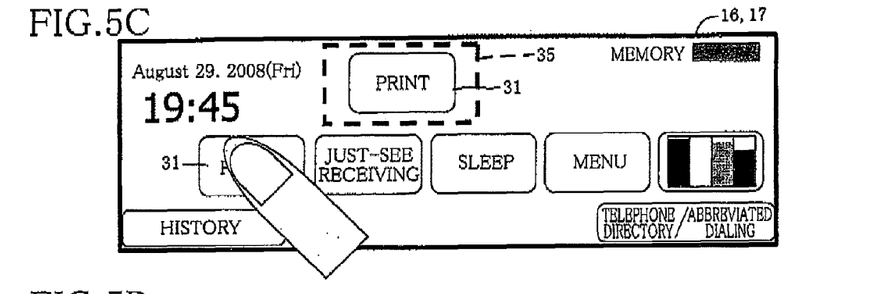

Further, the MFP 1 may be configured such that there is provided or prepared a display area 35 in advance in which, as shown in FIG. 5C, an image the same as the key image 31 the user's finger has approached the most is displayed without enlarging and displaying the display area and the item name of the key image 31 the user's finger has approached the most. Where the MFP 1 is thus configured, the user can recognize which key image his or her finger has approached the most even where the key image 31 and/or the item name of the key image 31 is or are hidden by the user's finger. Thus, it is possible to prevent the operational error that the user touches an unintended area with his or her finger, for example. It is noted that the MFP 1 may be configured such that, where the user's finger has touched the key image 31 displayed on or within the display area 35, a processing corresponding to the key image 31 is performed. Further, the MFP 1 may be configured such that only the item name is displayed on the display area 35.

It is noted that, in these modifications, where the output value detected by the sensor in a key image different from the key image 31 becomes a value larger than the output value detected by the sensor in the key image 31, an item name of the different key image may be displayed within the words balloon 34, or an image the same as the different key image is displayed on the display area 35. Where the MFP 1 is thus configured, it becomes possible to display the item name of the key image and/or the key image the user is expected to select, thereby preventing the operational error.

Figure 5D:
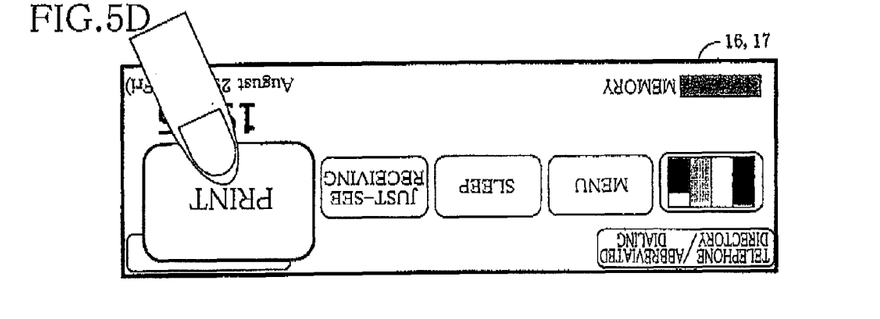

Further, the MFP 1 may be configured in the following manner. That is, where the user operates the touch panel 17 by extending his or her arm from the back side of the MIT 1 to the front side thereof (with reference to FIG. 1), as shown in FIG. 5D, the item name of each key image displayed on the LCD 16 is displayed so as to be rotated by 180 degrees, and the print key is enlarged and displayed. Further, the MFP 1 may be configured such that, where the user operates the touch panel 17 from a right side of the MFP 1, for example, the item name of each key image displayed on the LCD 16 is displayed so as to be rotated leftward by 90 degrees. Likewise, the MFP 1 may be configured such that, where the user operates the touch panel 17 from a left side of the MFP 1, the item name of each key image displayed the LCD 16 is displayed so as to be rotated rightward by 90 degrees. Where the MFP 1 is thus configured, when the user operates the touch panel 17, the item name displayed on the LCD 16 is displayed on a front side of the user (i.e., without being rotated) such that characters of the item name are not inverted or inclined for the user, and thus the user can easily recognize the item name. Thus, it is possible to prevent an operational error that the user touches an unintended area, for example. Further, since the print key is enlarged and displayed so as to be rotated by 180 degrees, it is possible to prevent the operational error that the user touches an unintended area, for example.

Further, in the present embodiment, the MFP 1 is configured such that, where the display area of the key image the user's finger has approached the most is enlarged and displayed, the enlarged and displayed key image partly or entirely covers the other key images. However, the MFP 1 may be configured such that, where the other key images are partly or entirely covered, positions at which the enlarged and displayed key image and the other key images are displayed are displaced such that any of the other key images is not covered.

Further, the MFP 1 may be configured such that, in the case where the other key images are partly covered or hidden by the enlarged and displayed key image, even where the rest of the display area of the other key images which are not covered are touched by the finger, an input by the touch is rejected. Since the enlarged and displayed key image is a key image the user's finger has approached the most, there is a high possibility that the enlarged and displayed key image is a key image the user intends to touch. On the other hand, there is a low possibility that each of the key images partly covered with the enlarged and displayed key image is the key image the user intends to touch. Thus, it is possible to prevent the operational error that the user touches an unintended area, for example, by rejecting or canceling the input for the key images partly covered with the enlarged and displayed key image.

Further, in the present embodiment, where the display area of the key image the user's finger has approached the most is enlarged and displayed, display of current date and time may partly or entirely covered. In order to solve this problem, the MFP 1 may be configured such that, where the display of the current date and time is partly or entirely covered, a position of the display of the current date and time is moved, whereby the current date and time is always displayed on the LCD 16. As a result, the user can always check the current date and time, thereby improving usability of the MFP 1. It is noted that, in the above-described embodiment, the key image is displayed as an image whose edge or periphery is surrounded with a frame, but the present invention is not limited to this configuration. For example, where the key image is displayed against a background of a color different from that of the key image, the enlarged and displayed key image is clearly displayed even where no frame is provided on a periphery of the enlarged and displayed key image. In this case, an item of the key image can be clearly displayed by displaying the item name of the key image on a position located on the key image. Further, even in a case where a color of the key image and a color of the background are the same as or similar to each other, the enlarged and displayed key image can be clearly displayed by adding a black shadow to the periphery of the enlarged and displayed key image instead of the frame. Further, where the enlarged and displayed key image is displayed in three dimensions, the enlarged and displayed key image can be displayed more clearly.

What is claimed is:

1. An inputting apparatus, comprising:
 a display unit on which an image is displayed;
 a detecting portion configured to detect an approach value which represents an approaching degree or a touching degree of an input object with respect to each of positions in the display unit and which becomes larger where the approaching degree or the touching degree is a certain degree than where the approaching degree or the touching degree is a degree smaller than the certain degree;
 a button-display portion configured to display at least one button on the display unit, each of the at least one button comprising:
  a display area comprising an entire area in which an image representing the each of the at least one button is displayed, and
  a button name of the each of the at least one button displayed in the display area;
 a receiving portion configured to receive an input of a predetermined command assigned to one of the at least one button when an approach value detected in the one button displayed by the button-display portion exceeds a first threshold value;
 a positional-information detecting portion configured to detect positional information indicating a position of the input object on the display unit;
 an entering-position specifying portion configured to specify an entering position at which the input object has entered the one button for the first time on the basis of the positional information detected by the positional-information detecting portion;
 a reference-point determining portion configured to determine a reference point on the basis of the entering position specified by the entering-position specifying portion; and an enlarging and displaying portion configured to enlarge and display only the one button on the display unit when the approach value detected in the one button exceeds a second threshold value which is smaller than the first threshold value, wherein the enlarging and displaying portion is configured to enlarge the display area of the one button at a predetermined ratio from the reference point determined by the reference-point determining portion, wherein the enlarging and displaying portion is configured to enlarge the button name of the one button at another predetermined ratio in the enlarged display area at a position distant from the reference point by a distance greater than or equal to a predetermined distance, and wherein the enlarging and displaying portion is configured to separate the button name of the one button into a plurality of parts and to arrange the plurality of parts in the display area, such that an entirety of the button name is displayed in the display area at a position different from the entering position.

2. The inputting apparatus according to claim 1, wherein the button-display portion is configured to simultaneously display a plurality of buttons on the display unit, wherein the enlarging and displaying portion includes an extracting portion configured to extract all ones of the plurality of buttons displayed on the display unit, the ones having respective approach values having detected by the detecting portion, each of which exceeds the second threshold value, and wherein the enlarging and displaying portion is configured to enlarge and display only one of the buttons extracted by the extracting portion, the one having the largest approach value.

3. The inputting apparatus according to claim 1, wherein the enlarging and displaying portion is configured to display a button name representing a name of the one button at a position which is different from the position of the input object detected by the positional-information detecting portion and which overlaps with the one button enlarged and displayed by enlarging and displaying portion.

4. The inputting apparatus according to claim 3, wherein the button-display portion is configured to display the one button by using a frame representing an edge of the one button, and wherein the enlarging and displaying portion is configured to display the button name within the frame.

5. The inputting apparatus according to claim 4, wherein the enlarging and displaying portion is configured to display the button name, such that the size of the displayed button name is reduced, or such that the plurality of parts are displayed on a plurality of lines.

6. The inputting apparatus according to claim 3, wherein the enlarging and displaying portion is configured to display the button name at a position distant from the position of the input object by a predetermined distance.

7. The inputting apparatus according to claim 6, wherein the enlarging and displaying portion is configured to change a manner of the display of the button name such that the button name is displayed within the frame and at the position distant from the position of the input object by the predetermined distance.

8. The inputting apparatus according to claim 1, wherein the second threshold value is a value which is smaller than an approach value at a time when the input object touches the display unit.

9. The inputting apparatus according to claim 1, wherein the enlarging and displaying portion is configured to enlarge and display, instead of the one button, another button different from the one button where the approach value does not exceed the first threshold value and where an approach value of said other button is larger than that of the one button.

10. The inputting apparatus according to claim 1, wherein a direction in which the input object is to be moved is estimated on the basis of a change of a position of the input object, and wherein the enlarging and displaying portion is configured to display the button name on the display unit on the basis of the estimated direction in which the input object is to be moved, such that the button name is not hidden by the input object.

11. The inputting apparatus according to claim 10, wherein the enlarging and displaying portion is configured to display the button name, such that an orientation of the button name is changed on the basis of the estimated direction.

12. The inputting apparatus according to claim 1, wherein the enlarging and displaying portion is configured to display the button name at a tip of the input object.

13. The inputting apparatus according to claim 1, wherein, in a state in which the input object has approached the one button enlarged and displayed by the enlarging and displaying portion, a position at which the button name is displayed continues to be changed to a position distant from the input object, such that the button name is not hidden by the input object during the movement of the input object over the one button.

14. The inputting apparatus according to claim 1, wherein the entering-position specifying portion is configured to specify, as the entering position, a position at which the input object has entered the one button for the first time, by reference to a history of output voltage of the display unit.

15. The inputting apparatus according to claim 1, wherein the display unit is separated into a plurality of areas, and wherein the entering-position specifying portion is configured to specify the entering position on the basis of one of the plurality of areas that the input object has approached for the first time.

16. The inputted apparatus according to claim 1, further comprising an input-rejecting portion configured to reject the input to the at least one button other than the enlarged button when the one button is enlarged and displayed.

* * * * *